July 15, 1969  V. W. H. MEYER  3,455,173
SOLDERLESS SAFETY-LOCK TANGENT ARM ASSEMBLY
Filed Aug. 4, 1967  2 Sheets-Sheet 1

INVENTOR.
VICTOR W. H. MEYER,
BY
Berman, Davidson & Berman
ATTORNEYS.

July 15, 1969  V. W. H. MEYER  3,455,173
SOLDERLESS SAFETY-LOCK TANGENT ARM ASSEMBLY
Filed Aug. 4, 1967  2 Sheets-Sheet 2
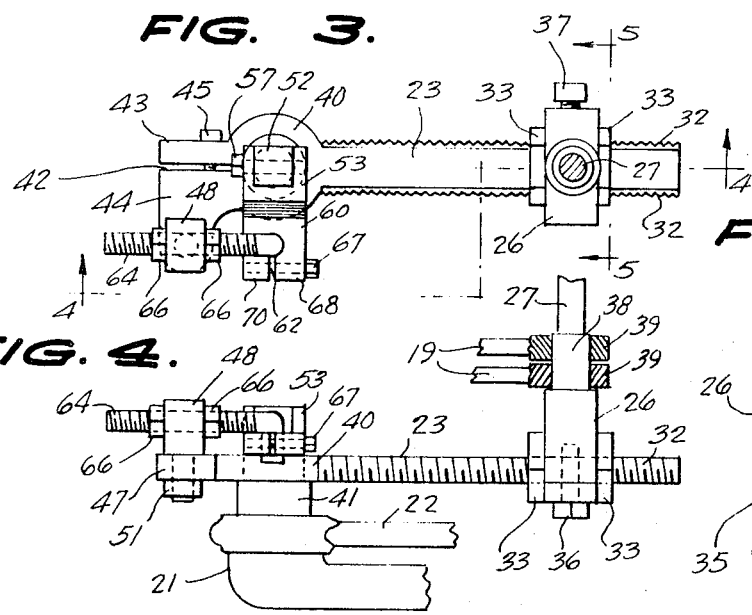
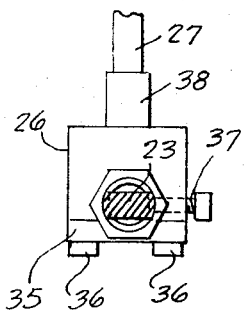
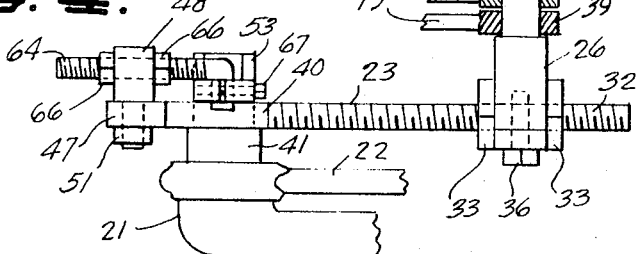
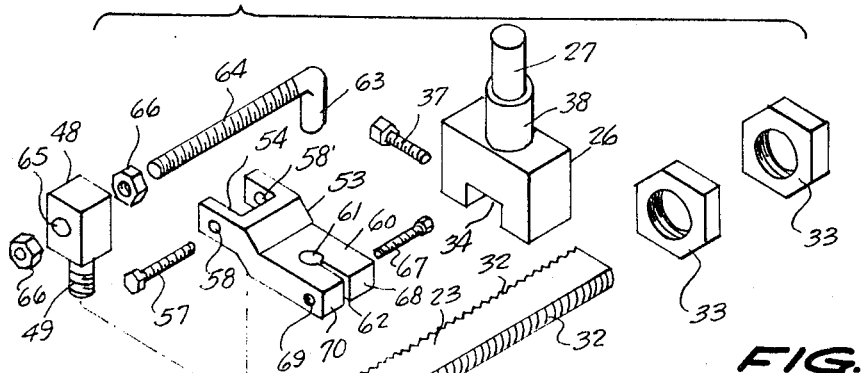
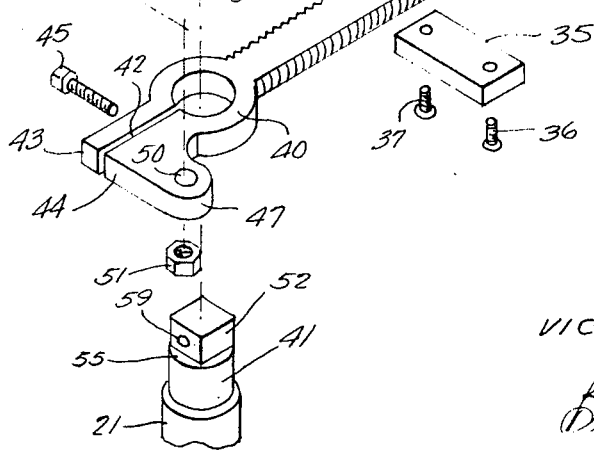
INVENTOR.
VICTOR W. H. MEYER,
BY
Berman, Davidson & Berman
ATTORNEYS.

United States Patent Office 3,455,173
Patented July 15, 1969

3,455,173
SOLDERLESS SAFETY-LOCK TANGENT ARM ASSEMBLY
Victor W. H. Meyer, 1124 Del Rio Drive,
El Paso, Tex. 79915
Filed Aug. 4, 1967, Ser. No. 658,510
Int. Cl. F16h *21/14, 21/48*
U.S. Cl. 74—69                                        4 Claims

ABSTRACT OF THE DISCLOSURE

A precisely adjustable rigid mechanical connection to take the place of the difficult soldered connection heretofore employed between the crank and the tangent arm in a positive displacement gas meter. The top crank post has a squared projection received in and rigidly-secured in a notch in one end of a laterally-extending anchor bracket. The tangent bar has a laterally-projecting apertured lug in which is secured an anchor block. A pivot stop screw extends through a horizontal bore in the anchor block and is locked thereto by adjustable fastening nuts. The stop screw has a depending vertical leg received in an aperture of and clamped to the laterally-extending anchor bracket.

---

This invention relates to gas meters, and more particularly to an improved precision connection between the tangent arm and the upper crank post of a gas meter.

A main object of the invention is to provide a novel and improved precisely adjustable rigid mechanical connection to take the place of the difficult soldered connection heretofore employed between the crank and the tangent arm in a positive displacement gas meter, the improved connection involving relatively simple parts, being easy to install, and being arranged to provide automatic and true alignment of all its component parts.

A further object of the invention is to provide an improved solderless connection structure for connecting the tangent arm to the top crank post of a conventional gas meter, the improved connecting structure being compact in size, involving very inexpensive components, being easily accessible, and being durable in construction.

A still further object of the invention is to provide an improved precisely adjustable mechanical connection between the top crank post and the tangent arm of a gas meter, the improved connection being such that it can be easily assembled in the field without requiring the use of high temperature procedures such as soldering or the like, whereby fire and explosion hazards are considerably reduced, the improved construction being such that the tangent arm assembly cannot break loose from the top of the crankshaft post, and the improved construction further providing a considerable saving in time in the assembly and disassembly of the gas meter.

A still further object of the invention is to provide an improved precisely adjustable rigid mechanical connection to take the place of the relatively unsatisfactory difficult soldered connection heretofore employed between the top of the tangent crank post and the tangent arm of a gas meter, the improved connection structure being applicable for a wide range of current designs of gas meters and being relatively easy to install in the field.

Further objects and advantages of the invention will become apparent from the following description and claims, and from the accompanying drawings, wherein:

FIGURE 3 is an enlarged horizontal cross-sectional detail view taken substantially on the line 3—3 of FIGURE 2.

FIGURE 4 is a vertical cross-sectional view taken substantially on the line 4—4 of FIGURE 3.

FIGURE 5 is a horizontal cross-sectional view taken substantially on the line 5—5 of FIGURE 3.

FIGURE 6 is an exploded perspective view showing the various parts associated with the improved mechanical connection between the top crank post and the tangent arm according to the present invention and as employed in FIGURES 1 to 5.

Figure 1:
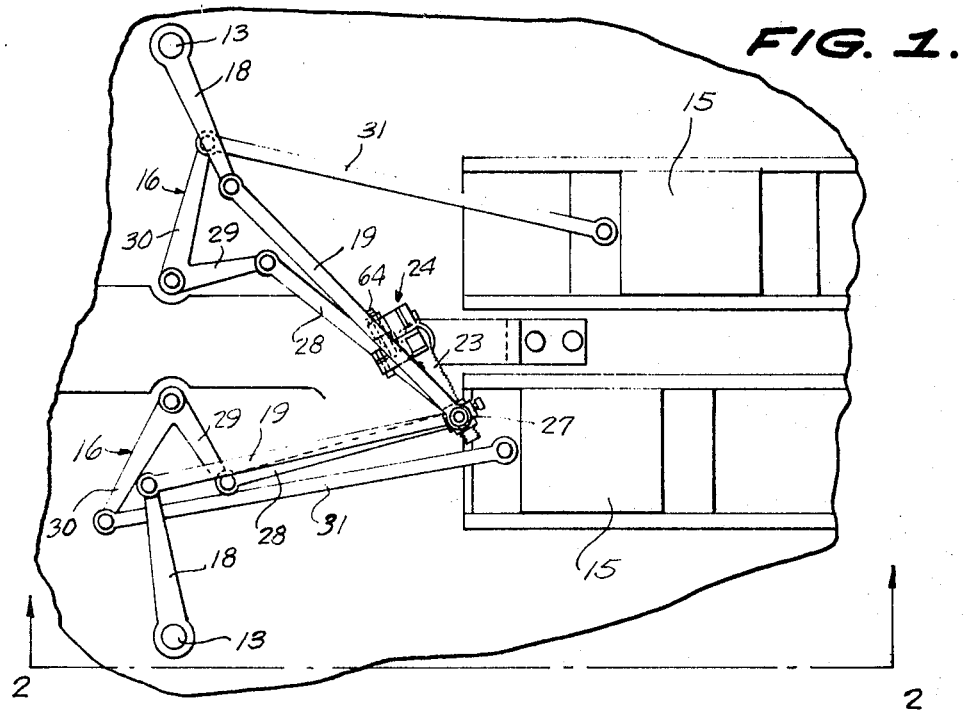
FIGURE 1 is a fragmentary top plan view of the upper portion of a gas meter provided with an improved tangent arm connection in accordance with the present invention.
Figure 2:
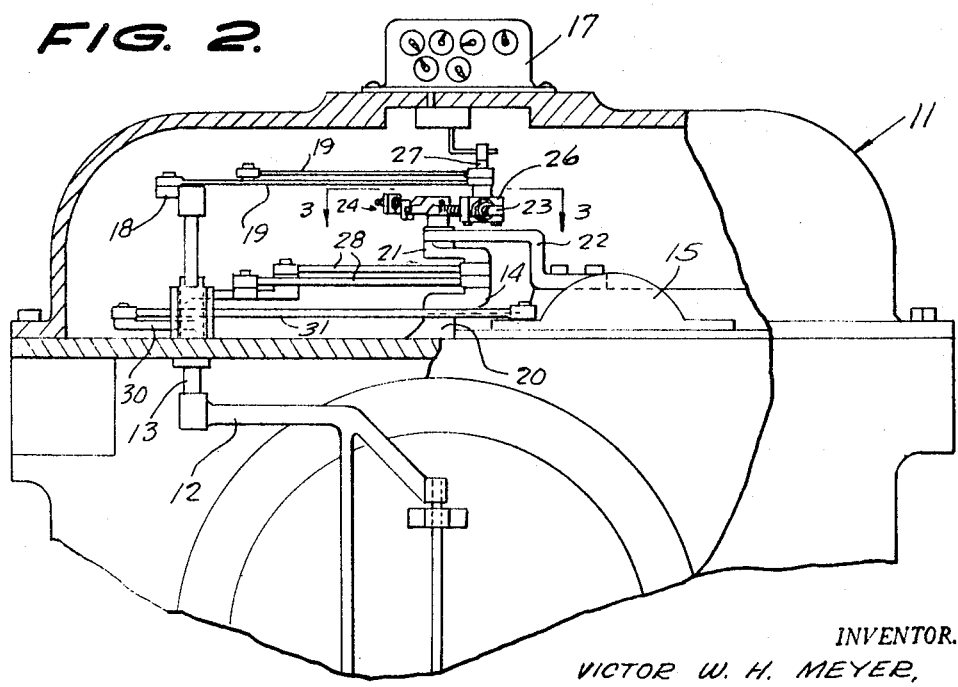
FIGURE 2 is a fragmentary vertical cross-sectional view taken substantially on the line 2—2 of FIGURE 1.

Referring to the drawings, 11 generally designates a gas meter of the positive displacement type which includes conventional operating structure such as drive arms 12, flag arm posts 13, a crank assembly 14, valves 15, 15, bell cranks 16, 16, and an indication unit 17. Flag arm links 18 and 19 drivingly-connect the posts 13 to the crank member 14. The lower supporting post element of the crank member 14 is rotatably-supported in a bottom crank bearing 20 and the upper crank post element, shown at 21, is rotatably-supported in the horizontal arm of a fixed tangent crank bracket 22. A tangent crank arm, shown at 23, is connected to the top end of the upper crank post element 21 by an improved rigid mechanical connecting structure according to the present invention, designated generally at 24. The tangent bar 23 has adjustably-mounted thereon, in a manner presently to be described, a wrist-pin block 26 provided with an upstanding tangent arm wrist pin 27 which is drivingly-connected in a conventional manner to the indication assembly 17. The top end portions of the flag arm posts 13 are connected to the wrist pin 27 by respective pairs of link flag arm members 18 and 19. The valves 15 are operated from the crank 14 by crank arms 28 connecting the intermediate portion of the crank member 14 to respective arms 29 of the bell-crank levers 16. The other arms 30 of the bell-crank levers 16 are connected to the valves 15 by valve arms 31. The arms 18 and 19 provide the driving connections between the flag arm posts 13 and the tangent bar 23. The block 26 must be carefully adjusted on the tangent bar and the tangent bar must be precisely mounted on the top end of the upper crank post element 21 in order to insure accurate operation of the gas meter.

The structure heretofore described is generally conventional, and herefore the tangent arm 23 has been rigidly-connected to the top crank post element 21 by soldering. This has involved the use of flame equipment, which is relatively hazardous in the conditions involved, and also is a difficult operation since the tangent arm assembly 23 must be accurately aligned and must be properly oriented in order to prevent binding of the flag arms 19, 19 during the operation of the meter. In many instances the connections must be unsoldered and resoldered until the proper orientation of the tangent arm 23 with respect to the crank post arm 21 is achieved. Also, as above-mentioned, considerable hazards are involved in the soldering operations due to the fact that there is a possibility of gas leakage in the area and there is considerable risk that the meter will catch fire or explode.

The connection assembly 24 is intended to eliminate the hazards, difficulties and time-consuming steps involved in the above-described soldering procedure.

Referring now to FIGURES 3, 4 and 5, it will be seen that the tangent arm 23 is relatively flat and is provided at its opposite edges with the usual threads 32 engageable by a pair of nuts 33, 33 adjustable on the threads 32 and adapted to be arranged on opposite sides of the tangent wrist-pin block 26. The block 26 is provided with a downwardly-facing rectangular notch 34 adapted to slidably receive the tangent arm 23, and a cover plate 35 is fastened to the bottom of the block 26 by means of fastening screws 36, 36, as shown in FIGURE 6. An Allen set screw 37 is threaded through one side of the block 26 and can be tightened into clamping engagement with the bar 23. The block 26 is locked in adjusted position on the bar 23 by the lock nuts 33, 33 disposed on opposite sides of block 26 in the manner clearly shown in FIGURES 3 and 4. Block 26 is also locked in position by tightening the set screw 37. The wrist pin 27 is provided with the enlarged bearing collar portion 38 rotatably received in circular bearing eye elements 39, 39 provided on the ends of the flag arms 29, as shown in FIGURE 4.

As is clearly shown in FIGURE 6, the tangent arm is formed adjacent one end with the enlarged bearing ring portion 40 which is rotatably engaged on the cylindrical bearing portion 41 of the top end of the upper crank post element 21. The ring element 40 communicates with a longitudinal slit 42 defining a finger 43 on one side thereof and a lug 44 on the opposite side thereof. A clamping screw 45 is engaged through the finger 43 and is threadedly engaged in the lug 44, as shown in FIGURE 3, to clamp the ring 40 to the post portion 41. Lug 44 has a laterally-projecting apertured portion 47. A block member 48 has a depending stud 49 which is engaged through the aperture 50 of the laterally-projecting lug portion 47. A nut 51 is threaded on the stud 49 below lug portion 47 to clamp the block 48 thereto.

The top end of the upper crank post element 21 comprises a squared lug 52. An anchor bracket 53 is formed at one end with a square notch 54 which closely receives the lug 52 and which is supported on the shoulder 55 defined between the squared lug 52 and the cylinder portion 41, as shown in FIGURE 6. The anchor bracket 53 is rigidly secured to the lug 52 by a fastening screw 57 which engages through aligned apertures 58, 58' provided in the fingers on opposite sides of notch 54 and through an aperture 59 formed in lug 52. The aperture 58' is tapped to threadedly receive the screw 57, so that when the screw 57 is tightened the bracket 53 is rigidly secured to the lug 52.

The anchor bracket 53 has the downwardly-offset outer portion 60 formed with an aperture 61 and a slit 62 connecting aperture 61 to the outer end edge of offset bracket portion 60, as is clearly shown in FIGURE 6. Aperture 61 receives the depending vertical arm 63 of a pivot stop screw 64 which is engaged through a bore 65 provided in the block 48 and which is locked thereto by the provision of lock nuts 66, 66 threaded on screw 64 on opposite sides of block 48, which is clearly shown in FIGURE 3. A clamping screw 67 is engaged through a bore provided in one of the fingers 68 defined on one side of slit 62 and is threadedly engaged in a tapped bore 69 provided in the remaining finger 70, as shown in FIGURE 6.

It will be clearly apparent from the above description that the angular position of the tangent arm 23 relative to the upper crank post element 21 may be accurately adjusted and clamped by means of the locking nuts 66, 66 provided on the stop screw 64. The depending leg 63 may be likewise be clamped to the outer anchor bracket portion 60 by tightening the screw 67.

The notch 34 in block 26 preferably has a close sliding fit with respect to the tangent arm 23 and is held in close sliding engagement with the tangent arm by the bottom retaining plate member 35.

Similarly, the notch 54 in the anchor bracket 53 closely receives the square lug 52 and is rigidly interlocked therewith.

Due to the adjustability of the pivot stop screw 64 in the block 48, and the adjustability of the tangent wrist-pin block 26 along the tangent arm 23, the above-described connection structure provides all the necessary adjustments required for the associated gas meter. At the same time, the assembly provides a rigid mechanical connection of the tangent arm 23 to the top end of the crank post member 21 without the necessity of soldering any parts together.

While a specific embodiment of an improved tangent-arm connection structure for a gas meter has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a gas meter of the type having a rotary vertical flag-arm post, a horizontally-rotatable tangent crank member provided with vertically aligned upper and lower vertical crank-post elements journaled to the frame of the meter, a tangent arm having an end portion receiving and supported on said upper crank-post element and having an adjustable wrist-pin block thereon provided with an upstanding vertical wrist-pin, indicating means driven by said wrist-pin, and flag arms drivingly connecting the flag-arm post to said wrist-pin, means rigidly connecting said tangent arm to said upper crank-post element comprising a laterally substantially horizontally-extending anchor bracket, means to non-rotatably and rigidly connect said anchor bracket to the top end of said upper crank-post element, laterally-projecting lug means on the tangent arm, and means adjustably connecting said lug means to said anchor bracket, wherein said top end of the upper crank-post element comprises a non-circular lug and said anchor bracket is formed with an opening closely fitting said non-circular lug, wherein said opening comprises a notch formed in an end of the anchor bracket, wherein said non-circular lug is substantially square and said notch is rectangular and closely receives the square lug, and wherein the means adjustably connecting the lug means to the anchor bracket comprises an upstanding anchor block secured on said laterally-projecting lug means, a threaded substantially horizontal stop screw adjustably connected to said last-named anchor block, and a depending vertical leg on the end of the stop screw engaged through the outer portion of the anchor bracket.

2. The gas meter tangent-arm connection structure of claim 1, and wherein the last-named upstanding anchor block has a horizontal bore receiving the stop screw and wherein respective clamping nuts are provided on the stop screw clampingly engaging opposite sides of the last-named upstanding anchor block.

3. The gas meter tangent-arm connection structure of claim 2, wherein said outer portion of the anchor bracket is formed with an aperture receiving said depending vertical leg and is slit outwardly from said aperture, and wherein a clamping screw is engaged through the segments defined on opposite sides of the slit portion of the anchor bracket.

4. The gas meter tangent-arm connection structure of claim 3, and wherein the tangent wrist-pin block is formed with a bottom rectangular notch closely and slidably receiving the tangent arm is provided with a bottom plate member detachably secured to the bottom of the tangent wrist-pin block across the bottom of said last-named rectangular notch.

References Cited

UNITED STATES PATENTS

| 1,421,408 | 7/1922 | Collyer | 287—52.02 |
| 1,827,973 | 10/1931 | Dezendorf | 73—281 |
| 2,599,514 | 6/1952 | Menkemeller | 73—268 |
| 3,119,264 | 1/1964 | St. Clair | 73—281 |

FRED C. MATTERN, Jr., Primary Examiner

W. S. RATLIFF, Jr., Assistant Examiner

U.S. Cl. X.R.

73—281; 287—52.02